Patented Sept. 5, 1950

2,521,532

UNITED STATES PATENT OFFICE 2,521,532

LIGNIN RESINS AND PROCESS OF MAKING SAME

Harry A. Mitman and Raymond N. Evans, Laurel, Miss., assignors to Masonite Corporation, Laurel, Miss., a corporation of Delaware No Drawing. Application July 27, 1946, Serial No. 686,722

5 Claims. (Cl. 260—17.4)

This invention relates to resins made from components comprising lignin in substantial proportions, and the method of making and using such resins.

By the present invention, lignin is reacted with furfuryl alcohol and formaldehyde, or formaldehyde precursors, in the presence of an acid catalyst, and resins are formed having thermosetting characteristics, good electrical properties, and good resistance to absorption of water. In one embodiment the acid catalyst is removed before the final setting of the reaction product. In this way resins are formed having extra good electrical properties.

The resins prepared in accordance with the present invention may be used alone or together with other resinous materials in various ways, as in the preparation of solutions for impregnating and laminating purposes, or in the preparation of protective coatings and varnishes. The resins may be used with or without fillers for making molded articles. The cured resins provide strong laminating bonds and are especially effective as bonding agents in the production of laminated paper, plywood, hardboard or other fibrous boards, and the like. These resins are well-adapted to provide protective coatings for material in sheet, wire and other forms. The resins are also useful for addition to fiber materials, which are to be consolidated into sheet and other products and the final curing of the resin effected under heat and pressure. Products as described including the resin formed in accordance with the present invention have high strength, good electrical properties, and good resistance to absorption of water. Sheet products thus formed are suitable for electrical panels, and the like, and are best adapted for such uses when the catalyst has been removed prior to final curing of the resin.

A principal object of the invention is the provision of a novel resin and process of making same from lignin, furfuryl alcohol and formaldehyde in the presence of an acid catalyst. A further object consists of the provision of a novel resin and process of making same from lignin, furfuryl alcohol and formaldehyde in the presence of an acid catalyst, and which process includes removal of the catalyst prior to final curing.

In carrying out the present invention, lignin, furfuryl alcohol and formaldehyde are caused to react in the presence of an acid catalyst. The reaction is carried out at an elevated temperature which will be varied depending upon the catalyst used. In forming the resin, it is important that the reactive components be reacted simultaneously in order to obtain the proper bonding between the lignin, furfuryl alcohol and the formaldehyde and to obtain uniformity in the final resin product.

The most favorable conditions for catalytic action in forming the resin is an acid condition for the reaction mixture of lignin, furfuryl alcohol and formaldehyde of a pH from about 3.5 to 2.5. Higher pH values may be used in forming the resin although the resin forming reaction will be much slower. Much lower pH, as for example 1.5 is preferably avoided since the reaction is very rapid and tends to become explosive. Generally stated, any acid catalyzing material which produces the proper hydrogen ion concentration (pH) in the reaction mixture to promote the reaction between the lignin, furfuryl alcohol and formaldehyde, may be used. Examples of suitable acids are oxalic, phosphoric, sulphuric, formic, citric, succinic, tartaric, hydrochloric, boric, maleic, lactic, and the like acids.

The lignin, furfuryl alcohol, formaldehyde and catalyst are mixed together. This mixture is a thin mobile liquid. As the reaction proceeds upon application of heat, the viscosity gradually increases until a state (hereinafter referred to as intermediate state) is reached such that at room temperature the resin has about the viscosity of heavy molasses. In these states the resin is soluble in suitable organic solvents such as named below, but it is insoluble in such organic solvents in the final heat hardened state.

Removal of the acid catalyst from the resinous material can be carried out most advantageously while the material is in the intermediate state. To remove the acid catalyst, a metal hydroxide or a metal carbonate is added in sufficient quantity to react with the acid catalyst and form a metal salt. The hydroxides and carbonates of such common metals as magnesium, calcium, barium, strontium, sodium, potassium and the like, are well suited for the purpose. Water is present to some extent as a result of having been added with the formaldehyde, having been formed through the condensation reaction between the lignin, furfuryl alcohol, and formaldehyde, or otherwise. The water can be removed as by decanting or by heating the resinous material, preferably under vacuum. If the water is decanted, a considerable part of the formed salt may be removed therewith.

An organic solvent in which the formed resin is soluble and the formed salt is substantially insoluble is then added in sufficient quantity so that the resin solution will contain about 25 to 50% solids. The salts which remain will settle from the solution. The settled precipitate is removed from the solution containing the dissolved resin by any suitable procedure such as by centrifuging, decanting off the supernatant liquid or the like. Any organic solvent, which will dissolve the resin at the intermediate state and at the same time will not dissolve the formed salt, may be used. Examples of such organic solvents are organic ethers as ethylene glycol monomethyl ether (methyl "Cellosolve"), dioxane, ethylene glycol mono-ethyl ether (ethyl "Cellosolve"), ethylene glycol mono-butyl ether (butyl "Cellosolve"), carbitol (diethylene glycol ethyl ether), butyl carbitol, diethyl carbitol, methyl carbitol, diethyl "Cellosolve," and the like or mixtures thereof.

When the lignin, furfuryl alcohol and formaldehyde resin, dissolved in an organic solvent and containing substantially no free acid has been prepared as described, it is ready for use for impregnating sheet products, for mixing with fiber, such as acid-hydrolyzed ligno-cellulose fiber, or other uses. These products or materials containing the resin solution are preferably heated in an oven to substantially remove the volatiles preparatorily to finally subjecting them to high heat and pressure. In the final heating and pressing operation, the lignin, furfuryl alcohol and formaldehyde resin is converted into a substantially thermo-set resin which is insoluble in the organic solvents used as a solvent for the resin during its intermediate state.

The lignin used in the reaction is preferably provided by subjecting wood or other ligno-cellulose material to hydrolysis in the presence of mild acids. The acid-hydrolyzed ligno-cellulose material is preferably prepared by subjecting wood chips to the action of high-pressure steam in a closed chamber, as for example a gun, as described in U. S. patent to Mason, No. 1,824,221. In such treatment, organic acids such as acetic and formic acids are formed, and acid-hydrolysis of the ligno-cellulose material is effected, with lignin being set free. After treatment with steam, the contents of the gun are disintegrated, preferably by being explosively discharged from the region of high-steam pressure to a region of substantially atmospheric pressure. Material so produced has a pH of about 3 to 4.

The time required for the steam treatment decreases rapidly with increase of the steam pressure used. For example, 25 minutes treatment with steam at 275 p. s. i. (temperature of 212° C.), has approximately the same effect as treatment for 5 seconds with steam at 1000 p. s. i. (temperature of 285° C.). Fiber made by such treatment of wood chips is well adapted for production of fiber for making hardboards and like products. In general, the longer the steam treatment is continued at a given temperature, the higher is the proportion of the freed soluble lignin, and such longer steam treatment is preferable in case the lignin is to be extracted. For example, wood chips subjected to steam raised to 600 p. s. i. in 30 seconds, then raised to 1000 p. s. i. and held for 5 seconds, followed by explosive disintegration, contains a good proportion of extractible lignin, as for example 10 to 12% on dry weight of chips. Higher yields of such lignin can be extracted from ligno-cellulose material given a steam treatment of 15 or more seconds with steam at 1000 p. s. i., for example. For illustration, a typical figure for yield of soluble lignin from wood chips treated with steam at 1000 p. s. i. for 15 seconds and then disintegrated by explosive discharge, is about 17-18% based on dry weight of chips. The steam-treated and disintegrated material is preferably washed with water to largely remove the water-soluble organic acids, such as formic and acetic, and water-soluble or water-dispersible derivatives of hemi-cellulosic material present in wood or equivalent ligno-cellulose material.

For extraction of the lignin from acid-hydrolyzed ligno-cellulose, dilute alkali solution, such as 1-3% sodium hydroxide solution for example, is preferably used, and the lignin precipitated by acidifying the solution, as for example by addition of hydrochloric acid, and then separated from the liquid by filtration or by other means. The separated lignin is preferably further treated with dilute mineral acid, such as hydrochloric or sulfuric, to set free any cations picked up in the process, filtered and washed with distilled water until free of acid. Instead of treating with dilute alkali, organic solvents, such as methyl "Cellosolve" for example, can be used to dissolve the lignin, and the lignin recovered by precipitating in water or by evaporating the solvent or in other ways. Treating the entire mass of hydrolyzed ligno-cellulose with such organic solvents is expensive, and it is preferred to extract the lignin therefrom with dilute alkali solution and precipitate it and then confine the treatment with the organic solvents to the lignin material so obtained. The lignin used for resin making in examples below was prepared by treatment of acid-hydrolyzed exploded wood fiber with 3% sodium hydroxide solution at a temperature of 50° C., and precipitated with dilute acetic acid, and treated and washed as above described. Such lignin when precipitated and dried is light and fluffy.

Acid-hydrolyzed ligno-cellulose fiber, for making sheet and the like products or filler material (used in the examples below), which may be used with the resins is prepared, for example, by subjecting wood or other ligno-cellulose material to the action of high-pressure steam, as described above. The hydrolysis treatment of the ligno-cellulose material is, however, generally not so severe as that applied to ligno-cellulose material which is hydrolyzed for the purpose of providing material from which to obtain lignin by extraction. The less severe hydrolysis is utilized in order to retain a better degree of fiber structure. Other fiber, such as alpha cellulose, glass, and the like may also be used.

In making lignin, furfuryl alcohol and formaldehyde resins, the quantity of lignin may be varied over a relatively wide range as for example, from about 10% to about 60%, preferably about 25 to 40%, based on the weight of the furfuryl alcohol. The mole ratio of furfuryl alcohol to formaldehyde may be between about 1 to ½ and about 1 to 3.

The following examples illustrate the preparation of lignin, furfuryl alcohol and formaldehyde resinous products in accordance with the present invention, and show the outstanding physical and electrical characteristics of such products. Parts in the examples are parts by weight.

*Example 1.*—56.5 parts lignin, 196 parts furfuryl alcohol, 81 parts of 37.5% formaldehyde, and 3.75 parts oxalic acid dihydrate were heated and stirred for 9 hours at 50 to 55° C. Magnesium oxide was stirred into the hot resin solution to react with the oxalic acid and form magnesium oxalate. Upon cooling to room temperature, the resin had a consistency of about heavy molasses and settled to the bottom of the container. A water layer containing some magnesium oxalate formed over the surface of the resin. The water layer was decanted from the container removing a substantial portion of the magnesium oxalate.

241 parts methyl "Cellosolve" were added to the resin and stirred until the resin went into solution. The resin solution contained 28.5% resin solids. 175 parts of this resin solution were mixed with 100 parts ground acid-hydrolyzed ligno-cellulose fiber and during the mixing, additional methyl "Cellosolve" was added to the mixture to obtain thorough distribution of the resin throughout the fiber. After thorough mixing, the fibrous-resin mix was dried at about 40° C. for 18 hours under forced draft. This material was ground to pass through a 40-mesh screen. The volatile content was 7.1%. After grinding, the powdered resin-fiber mixture was further heated in an oven at 105° C. for 1½ hours, reducing the volatile contents to substantially zero.

A specimen was prepared by placing the resin-fiber mixture in a mold and heating and pressing at a temperature of 165° C. and a pressure of 1750 p. s. i. for a period of 6 minutes, and chilling while under said pressure The molded specimen had the following characteristics:

| | |
|---|---|
| Specific gravity | 1.41 |
| Modulus of rupture (p. s. i.) | 12,300 |
| Rockwell hardness (M Scale): | |
| Room temperature | 110 |
| 105° C | 80 |
| Per cent water uptake (24 hrs.) | .6 |
| Dielectric strength[1] (V. P. M.) | 900 |
| Dielectric constant | 7.1 |
| Power factor, per cent | 2.6 |
| Loss factor | .18 |

[1] Thickness of sample, 35 mils.

*Example 2.*—89.5 parts lignin, 196 parts furfuryl alcohol, 162 parts of 37.5% formaldehyde, and 4.3 parts of phosphoric acid were heated and stirred for 17 hours at about 60° C. Calcium carbonate was stirred into the hot resin solution in sufficient quantity to substantially neutralize the solution and to precipitate the phosphoric acid as calcium phosphate. Upon standing, the resin took on molasses-like consistency. The resin solution was subjected to vacuum evaporation (about 22 inches mercury) for 2 hours at a temperature up to 70° C. to remove water.

193 parts methyl "Cellosolve" were added to the resin and stirred until the resin went into solution and the solution allowed to stand until the calcium phosphate and any other insoluble material had settled to the bottom. The insoluble material was separated from the resin solution. Upon taking an acid number of the solution it was found to be slightly acid, and additional calcium carbonate was added to neutralize the remaining acid. The precipitate was allowed to settle and the resin solution, substantially free of acid catalyst, was separated from the precipitate. The resin solution contained 44.5% resin solids.

112 parts of the resin solution were mixed with 100 parts ground acid-hydrolyzed ligno-cellulose fiber and during the mixing additional methyl "Cellosolve" was added to the mixture to obtain thorough distribution of the resin throughout the fiber. After thorough mixing, the fiber-resin mix was dried overnight at 40° C. under forced draft. The dried material was ground to pass through a 40-mesh screen. The volatile content was 5.5%. The powdered resin-fiber mixture was then further heated in an oven at 105° C. for 30 minutes. The volatile content was then substantially zero.

A specimen was prepared by placing the resin-fiber mixture in a mold and heating and pressing at a temperature of 165° C. and a pressure of 1750 p. s. i. for a period of 5 minutes, and chilling while under said pressure.

The molded specimen had the following characteristics:

| | |
|---|---|
| Specific gravity | 1.42 |
| Modulus of rupture, p. s. i. | 14,700 |
| Rockwell hardness (M Scale): | |
| Room temperature | 111 |
| 105° C | 83 |
| Per cent water uptake, 24 hrs | 1.0 |
| Dielectric strength,[1] V. P. M | 900 |
| Dielectric constant | 6.9 |
| Power factor, per cent | 2.1 |
| Loss factor | .14 |

[1] Thickness of sample, 35 mils.

*Example 3.*—95 parts lignin, 196 parts furfuryl alcohol, 324 parts 37.5% formaldehyde, and .4 part concentrated sulphuric acid were heated and stirred for 10 hours at 60 to 65° C., followed by further heating under reflux for 5 hours at 98° C. At this stage, about .8 part additional concentrated sulfuric acid was added and the material further heated for 8 hours at 60° C. Barium hydroxide was stirred into the hot resin solution in sufficient quantity to substantially neutralize the solution and precipitate the sulfuric acid as barium sulfate. Upon cooling, the formed resin thickened and settled to the bottom of the container with a water layer formed over the surface of the resin. The water layer, containing some precipitated barium sulfate, was decanted from the container.

193 parts methyl "Cellosolve" were added to the resin and stirred until the resin went into solution and any remaining barium salts and other insoluble material settled to the bottom. The insoluble material was separated from the resin solution. The resin solution contained 43% solids.

116 parts of the resin solution were mixed with 100 parts ground acid-hydrolyzed ligno-cellulose fiber, and during the mixing, acetone was added to the mixture to obtain a uniform distribution of the resin throughout the fiber. After thorough mixing, the fiber-resin mix was dried overnight at 40° C. under forced draft. The dried material was ground to pass through a 40-mesh screen. The volatile content was 7.7%. The powdered resin-fiber mixture was then further heated in an oven at 105° for 30 minutes and the volatile content reduced to substantially zero.

A specimen was prepared by placing the resin-fiber mixture in a mold and heating and pressing at a temperature of 165° C. and a pressure of 1750 p. s. i. for a period of 5 minutes, and chilling while under said pressure.

The molded specimen had the following characteristics:

| | |
|---|---|
| Specific gravity | 1.43 |
| Modulus of rupture (p. s. i.) | 13,300 |
| Rockwell hardness (M Scale): | |
| Room temperature | 112 |
| 105° C | 60 |
| Percent water uptake (24 hrs.) | 2.1 |
| Dielectric strength[1] (V. P. M.) | 850 |
| Dielectric constant | 7.7 |
| Power factor, percent | 2.9 |
| Loss factor | .22 |

[1] Thickness of sample, 35 mils.

*Example 4.*—Acid-hydrolyzed ligno-cellulose sheets of about .7 specific gravity and about ½ inch thick were impregnated with methyl "Cellosolve" resin solution, containing about 28.5% resin solids as prepared in Example 1. The resin solution was cut back with acetone and the hydrolyzed ligno-cellulose sheets were suspended in the resin solution until the sheets had absorbed all the resin solution which could be absorbed. The impregnated sheets were placed in an oven at 105° C. for about 2 hours when the volatile content was reduced to substantially zero, and the resin content was about 44.4% based on the weight of dry sheet.

Two sheets were arranged in a pile and the pile was pressed in a heated press at a pressure of 1750 p. s. i. and at a temperature of 165° C. for a period of 5 minutes and chilled while under said pressure, to form an integral hardboard product.

This product had the following characteristics:

| | |
|---|---|
| Specific gravity | 1.40 |
| Modulus of rupture (p. s. i.) | 10,900 |
| Percent water uptake (24 hrs.) | .3 |
| Rockwell hardness (M Scale): | |
| Room temperature | 110 |
| 105° C. | 86 |
| Dielectric strength [2] (V. P. M.) | 420 |
| Dielectric constant | 5.3 |
| Power factor, percent | 1.66 |
| Loss factor | .088 |

[2] Thickness of sample, .305 inch.

For uses where the electrical properties of the finished product are not of substantial importance, the acid catalyst need not be removed from the lignin, furfuryl alcohol and formaldehyde resin. For example, when such resins are used for coatings, bonding material, impregnating material or the like, where only good strength, hardness, water and alkali resistance are of importance, it is not necessary to remove the acid catalyst. Lignin, furfuryl alcohol and formaldehyde resins were prepared as described in Examples 1, 2 and 4, but with the acid catalyst not removed from the resin, and pressed into test specimens. The characteristics of the lignin, furfuryl alcohol and formaldehyde resin products, which were so obtained with the catalyst in the finished product, appear in the following table:

| | Example Number | | |
|---|---|---|---|
| | 1 | 2 | 4 |
| Specific Gravity | 1.42 | 1.43 | 1.38 |
| Modulus of Rupture, p. s. i. | 12,000 | 10,400 | 7,960 |
| Rockwell Hardness (M Scale): | | | |
| Room Temperature | 104 | 107 | 101 |
| 105° C. | 70 | 43 | 67 |
| Per Cent Water Uptake, 24 Hrs. | .4 | .4 | .6 |
| 1% NaOH Alkali Uptake, 24 Hrs. | 1.6 | 2.2 | .5 |

It is to be understood that the specific data and procedures given are for illustration only and not for limitation; and the breadth of the invention is defined in the claims.

We claim:

1. The process of preparing a resinous material which comprises heating lignin, furfuryl alcohol and formaldehyde containing water in the presence of an acid catalyst until the fluid resin formation has advanced to the intermediate state, adding a compound chosen from the group consisting of hydroxides and carbonates of alkali metals and alkaline earth metals to react with the acid catalyst to precipitate a metal salt, removing the water from the resin, dissolving the resin in an organic solvent, removing the precipitated salt from the resin solution, and heating the fluid resin to form a substantially thermoset resin.

2. The process of preparing an integral resin-fiber product which comprises heating lignin, furfuryl alcohol and formaldehyde containing water in the presence of an acid catalyst until the fluid resin formation has advanced to its intermediate state, adding a compound chosen from the group consisting of hydroxides and carbonates of alkali metals and alkaline earth metals to react with the acid catalyst to precipitate a metal salt, removing the water from the resin, dissolving the resin in an organic solvent, removing the precipitated salt from the resin solution, mixing the resin solution with acid hydrolyzed ligno-cellulose fiber, and heating and pressing the mixture into an integral resin-fiber product.

3. The process as defined in claim 2 and wherein the acid is oxalic acid and the added compound is magnesium oxide.

4. The process as defined in claim 2, and wherein the acid catalyst is phosphoric acid and the added compound is calcium carbonate.

5. The process as defined in claim 2, and wherein the acid catalyst is sulphuric acid and the added compound is barium hydroxide.

HARRY A. MITMAN.
RAYMOND N. EVANS.

REFERENCES CITED

The following references are of record in the file of this patent:

UNITED STATES PATENTS

| Number | Name | Date |
|---|---|---|
| 2,323,333 | Kauth | July 6, 1943 |
| 2,325,570 | Katzen | July 27, 1943 |
| 2,371,136 | Harmon | Mar. 13, 1945 |
| 2,402,554 | Irvine et al. | June 26, 1946 |
| 2,404,840 | Harvey | July 30, 1946 |